US012508739B2

(12) United States Patent
Remus et al.

(10) Patent No.: US 12,508,739 B2
(45) Date of Patent: Dec. 30, 2025

(54) DEVICE AND METHOD FOR PRODUCING A CONCRETE, IN PARTICULAR A HIGH EARLY STRENGTH CONCRETE

(71) Applicant: SONOCRETE GMBH, Cottbus (DE)

(72) Inventors: Ricardo Remus, Cottbus (DE); Paul Schötzigk, Alt Zauche (DE); Max Jentzsch, Cottbus (DE)

(73) Assignee: SONOCRETE GmbH, Cottbus (DE)

( * ) Notice: Subject to any disclaimer, the term of this patent is extended or adjusted under 35 U.S.C. 154(b) by 0 days.

(21) Appl. No.: 18/640,518

(22) Filed: Apr. 19, 2024

(65) Prior Publication Data

US 2024/0262006 A1 Aug. 8, 2024

Related U.S. Application Data

(63) Continuation of application No. 18/039,826, filed as application No. PCT/EP2021/083591 on Nov. 30, 2021, now abandoned.

(30) Foreign Application Priority Data

Dec. 2, 2020 (DE) ..................... 10 2020 132 015.9
Apr. 9, 2021 (DE) ..................... 10 2021 108 917.4

(51) Int. Cl.
*B28C 5/00* (2006.01)
*B01F 31/85* (2022.01)
(Continued)

(52) U.S. Cl.
CPC ............... *B28C 5/48* (2013.01); *B01F 31/85* (2022.01); *B01F 33/811* (2022.01); *B28C 5/16* (2013.01); *B28C 7/024* (2013.01); *B28C 7/026* (2013.01)

(58) Field of Classification Search
CPC ............ B28C 5/48; B28C 7/025; B01F 33/811
See application file for complete search history.

(56) References Cited

U.S. PATENT DOCUMENTS 5,972,223 A * 10/1999 Jonsson .................. B01F 23/59
210/417
2005/0250879 A1 11/2005 Correll et al.
(Continued)

FOREIGN PATENT DOCUMENTS

CN 105252644 A 1/2016
CN 109574571 A 4/2019
(Continued)

OTHER PUBLICATIONS

Deutsche Norm; "Beton: Teil 1: Festlegung, Eigenschaften, Herstellung und Konformität;" Deutsche Fassung EN 206-1:2000; Jul. 2001.

(Continued)

*Primary Examiner* — Anshu Bhatia
(74) *Attorney, Agent, or Firm* — PATENT PORTFOLIO BUILDERS PLLC

(57) ABSTRACT

A device for producing a concrete includes a cement premixer for mixing a cement suspension, the cement premixer having an ultrasonic probe for preparing a cement suspension, a crystallization tank arrangement with the first crystallization tank, for increasing the early strengths of the concrete, and a concrete mixer for producing a concrete mixture from the premixed cement suspension, in particular with the addition of aggregates.

19 Claims, 11 Drawing Sheets

(51) Int. Cl.
*B01F 33/81* (2022.01)
*B28C 5/16* (2006.01)
*B28C 5/48* (2006.01)
*B28C 7/02* (2006.01)

(56) References Cited

U.S. PATENT DOCUMENTS

| | | | |
|---|---|---|---|
| 2009/0231950 A1 | 9/2009 | Spagnolo | |
| 2018/0318778 A1* | 11/2018 | Brothier | ................ B01F 23/69 |
| 2022/0274287 A1 | 9/2022 | Rößler et al. | |

FOREIGN PATENT DOCUMENTS

| | | |
|---|---|---|
| DE | 1096333 B | 1/1961 |
| DE | 1584305 A1 | 9/1971 |
| DE | 2209673 A1 | 9/1973 |
| DE | 3034110 A1 | 4/1982 |
| DE | 3716438 A1 | 12/1988 |
| DE | 20008198 U1 | 3/2001 |
| DE | 102007027080 A1 | 12/2008 |
| DE | 102013002973 A1 | 8/2014 |
| DE | 102016003644 A1 | 10/2017 |
| DE | 102017206660 A1 | 10/2018 |
| DE | 102019120939 A1 | 2/2021 |
| DE | 102020132015 A1 | 6/2022 |
| JP | H02121803 A | 5/1990 |
| JP | H0970811 A | 3/1997 |
| JP | H10152833 A | 6/1998 |
| JP | 2006305748 A | 11/2006 |
| JP | 2018538526 A | 12/2018 |
| JP | 2019188718 A | 10/2019 |
| JP | 2022545177 A | 10/2022 |
| RU | 2496748 C1 | 10/2013 |
| WO | 2020216940 A1 | 10/2020 |

OTHER PUBLICATIONS

Deutsche Norm; "DIN 1045-2, Tragwerke aus Beton, Stahlbeton und Spannbeton—Teil 2: Beton—Festlegung, Eigenschaften, Herstellung und Konformität—Anwendungsregeln zu DIN EN 206-1;" Aug. 2008.
International Preliminary Report on Patentability mailed Feb. 21, 2023 in related/corresponding International Application No. PCT/EP2021/083591.
International Search Report and Written Opinion mailed Mar. 14, 2022 in related/corresponding International Application No. PCT/EP2021/083591.
Korean Notice of Office Action mailed Oct. 11, 2023, for corresponding/related Korean Application No. 10-2023-7021459, including English translation (16 pages).
Office Action created Oct. 26, 2021 in related/corresponding DE Application No. 10 2020 132 015.9.
Office Action dated Jan. 13, 2024 in related/corresponding CN Application No. 202180081086.3.
Office Action dated Jul. 8, 2025 in related/corresponding JP Application No. 2023-533594.

* cited by examiner

DEVICE AND METHOD FOR PRODUCING A CONCRETE, IN PARTICULAR A HIGH EARLY STRENGTH CONCRETE

BACKGROUND AND SUMMARY OF THE INVENTION

Exemplary embodiments of the present invention relate to a device for producing a concrete, in particular a high early strength concrete, and to a method for producing a corresponding concrete.

The relevant prior art is shown in US 2018/318778 A1 and RU 2 496 748 C1.

An important parameter of a concrete composition is its early strength. Options for increasing the early strength of concrete include established processes such as heat treatment, the use of accelerating concrete admixtures or concrete technology methods such as increasing the cement content beyond what is structurally necessary or lowering the w/c ratio (the ratio of water to cement). However, these variants are often a compromise in which the time factor is bought by significantly increased production costs. In addition, although the early strength is improved, the changed composition may also lead to an undesirable change in the overall material properties (e.g., shrinkage cracks).

DE 37 16 438 A1 describes a device with a cement premixer, a concrete mixer, and a tank arranged in between. In this case, cement and water are mixed to form a cement paste. This is stored temporarily and then mixed with aggregates for concrete production, as is customary.

When mixing cement paste, the obstacle arises that only at (very) high w/c ratios there is sufficient free water to mix cement and water accurately. Since a large proportion of the water comes often bound as surface water on the aggregates in the concrete mixer, hence the amount of water available for premixing is reduced. At moderate to low w/c ratios (<0.50), a cement paste can then only be produced using high-performance plasticizers.

Furthermore, high mixing speeds are necessary for the complete dispersion of cement in water. This is taken into account in E01 DE 37 16 438 A1 by subclaims 3 and 4. These high-speed mixing tools wear out quickly due to the highly abrasive effect of the cement and are very susceptible to clogging (especially at low water contents).

The greatest challenge in this process arises from the provision of a uniform suspension quality throughout the entire production day. The aforementioned publication does not provide any answers here. However, it must be assumed here that the suspension is stored in a tank ("storage silo"). This is emptied for concrete mixing and refilled, wherein the pre-storage time must then be waited for again. Economic operation of the mixing plant is therefore not possible. If a large tank is now filled and gradually emptied, the suspension it contains will age over time, causing the resulting concrete properties to change significantly. Eventually, the cement suspension in the tank would solidify and make any further processing impossible.

Furthermore, two-stage mixing processes are known that improve the early strength. Applications of two-stage mixing processes are described in DE15 84 305 A or DE 10 2016 003 644 B4, among others. Here, the workability and early strength of concretes is to be improved by a two-stage mixing process, by 1.) intensive premixing of the binder components with and without sand and 2.) by final mixing in the concrete mixer.

Premixing using ultrasound is also known, as already described in more detail in DE102007027080A1 and in particular in DE102019120939 A1.

In this context, all two-stage concrete mixing processes come with the obstacle that the production of the suspension requires the provision of a certain amount of (mixing) water. The water content of a concrete depends on the water demand of the aggregates (Gk), the w/c ratio, and the cement content. However, since the added aggregates and especially the sand are never completely dry (e.g., the aggregates are sprinkled during the filling of underground storage facilities to keep dust formation low), the moisture adhering to the aggregates must be subtracted from the mixing water. This is done by measuring the moisture either during the weighing or transport process or in the concrete mixer. If the moisture content of the aggregates is moderate to high (approx. 3-8 wt. %), this moisture must be deducted from the mixing water accordingly. The following calculation example of a precast concrete with a w/c ratio of 0.46 of a running production of a precast concrete plant is provided for illustration:

TABLE 1

| Concrete formula w/c ratio 0.46 | | |
| --- | --- | --- |
| Concrete component | Proportion [kg/m³] | Moisture [wt %] |
| Cement | 350 | dry |
| Water | 161 | |
| Sand 0-2 mm | 698 | 6 |
| Gravel 2-8 mm | 276 | 1.5 |
| Gravel, 8-16 mm | 864 | 1.0 |
| Concrete admixtures (superplasticizer) | 2.45 | negligible |
| Mixing water after deduction of the moisture content of the aggregates | 106 | |

After deducting the moisture of the aggregates, the water available for preparing the suspension is 106 kg/m³, i.e., about ⅔ of the initial quantity. For the preparation of the suspension, a w/c ratio of 0.30 must now be selected. In order to mix such low w/c ratios accurately, higher superplasticizer dosages are required, which may optionally increase the concrete slump beyond a necessary level and additionally delay the hardening reaction of the cement.

Example 2 for illustration: If a w/c ratio of 0.35 is now applied in the production process of, for example, prestressed concrete elements, the following calculation results:

TABLE 2

| Concrete formula w/c ratio 0.35 | | |
| --- | --- | --- |
| Concrete component | Proportion [kg/m³] | Moisture [wt %] |
| Cement | 350 | dry |
| Water | 122 | |
| Sand 0-2 mm | 698 | 6 |
| Gravel 2-8 mm | 276 | 1.5 |
| Gravel, 8-16 mm | 864 | 1.0 |
| Concrete admixture | 4.2 | negligible |
| Mixing water after deduction of the moisture content of the aggregates | 67 | |

The water available for the production of a suspension in the premixing process is now 67 kg/m³, resulting in a w/c ratio of the suspension of 0.19, which can no longer be accurately premixed and metered on the basis of the technologies currently available.

Known methods try to solve this problem by, for example, pretreating the fine portion of the aggregates that has the highest moisture content (usually sand) in the premixer (DE15 84 305 A or DE10 2016 003 644 B4). This is obvious, however, since more water is thus available for the suspension mixing process. However, with this method, increased abrasion of the agitator elements by the abrasive sand and the well-known problem of "overmixing" must be expected. In the case of overmixing, small parts of the sand particles are separated by rapidly rotating stirring tools, i.e., the sand is crushed, which increases the water demand and worsens the processability.

Thus, the problem for the application of two-stage mixing processes can be summarized as follows: Low w/c ratios ensure high early compressive strengths, short mixing times ensure a fast concreting process, especially for large components that are filled in several steps. The partially high inherent moisture reduces the water available for the suspension mixing process.

In extreme cases, e.g., in humid weather, not enough water is available for the suspension mixing process. Currently, this can only be compensated by increasing the superplasticizer concentration, which may increase the flowability of the concrete beyond a necessary level, delay hardening and increase the cost of the concrete.

Based on this preliminary consideration, exemplary embodiments of the present invention are directed to a device and a method for the production of concrete with high early strengths while avoiding the aforementioned problem.

A device according to the invention for the production of a concrete comprises
  i a cement premixer for mixing a cement suspension;
  ii at least a first crystallization tank for increasing the early strengths of the concrete and
  iii a concrete mixer for producing a concrete mixture from the premixed cement suspension, in particular with the addition of aggregates.

In particular, the device according to the present invention has one or more crystallization tanks, which enables crystallization of individual constituents contained in the cement prior to their addition to the concrete. A plurality of crystallization tanks can form a crystallization tank arrangement within the scope of the present invention. In this case, the crystallization tanks are preferably arranged one above the other in the crystallization tank arrangement, so that the cement suspension can be transferred by gravity from an upper crystallization tank to a crystallization tank arranged below.

This device is based on the knowledge that a favorable water-to-cement ratio (w/c ratio) exists for a reaction-activating premixing of cement and water, especially with the use of ultrasound. This w/c ratio depends on the cement type and is preferably in the range of 0.50-2.0. Lower w/c ratios lead to stronger particle interactions due to the higher solids content, which favors strong heating of the suspension and can have a negative effect under certain circumstances.

Pretreatment of the cement suspension, in particular with ultrasound, produces metastable crystallization nuclei, which are given additional time to grow by storage in the crystallization tank and are (later) metered into the concrete mixer as stable crystallization nuclei.

This crystallization tank preferably comprises an agitator with a stirrer which keeps the cement suspension moving at a slow speed during the crystallization period.

A preferred stirring speed is less than 50 rpm, preferably 2-25 rpm, more preferably 5-20 rpm.

Due to the incipient crystallization of the cement constituents, a significantly higher early strength of the concrete is achieved for the concrete subsequently produced from it than without the crystallization tank.

It is also not necessary to use all the cement used in the concrete to this type of pretreatment; instead, it is sufficient to activate a partial quantity, which additionally promotes the crystallization of the remaining cement fed directly into the concrete mixer. Accordingly, the dimensioning and the energy budget for operating the cement premixer and the crystallization tank can be advantageously optimized.

According to the invention, the cement premixer has at least one ultrasonic generator, in particular an ultrasonic probe, for providing a cement suspension.

Unlike DE 37 16 438 A1, in the present invention the disintegration is not produced by high-speed mixing tools, but by the use of ultrasound.

At the same time, the fact that only a small portion of the cement (e.g., 20%) with a high water content (w/c$\gg$1.0) is premixed means that the ultrasound is at the same time less attenuated and, due to the small proportion of suspension in relation to the total concrete, the concrete is less heated.

Higher water contents also favor the dosing and cleaning of the device, especially also following a process for the operation of the device and a subsequent cleaning process.

An ideal ultrasound-assisted cement premixer is known from DE102019120939 A1, to which full reference is made with regard to the constructive design of a preferred cement premixer within the scope of the present invention.

Such a cement premixer not only achieves a pure mixing of cement and water, but also an activation of the cement constituents and the cement suspension, so that crystallization is also promoted. The cement premixer also has a stirrer that moves the cement suspension preferably at a higher stirring speed than the stirrer in the first crystallization tank.

Premixing in the aforementioned parameters and/or stirring speed typically results in the formation of air bubbles within the cement suspension, which can negatively affect the final strength of the concrete. These air bubbles are expelled during the continuous gentle mixing of the cement suspension in the crystallization tank. Therefore, the combination of the crystallization tank especially with an ultrasonic cement premixer is particularly preferred.

Another preferred aspect of the use of a crystallization tank is that, due to its design, an ultrasonic cement premixer can only provide a small quantity of cement suspension within a time interval, since the ultrasound has only a limited penetration depth with a larger quantity of cement suspension. In this case, the crystallization tank can also be used to store the cement suspension.

Preferably for low-energy and trouble-free operation, the cement premixer, crystallization tank and concrete mixer are arranged relative to the earth's gravity field in such a way that the cement suspension can flow by gravity from the cement premixer, into the crystallization tank and from there into the concrete mixer. Where this is not possible, a pump can be used to transport the suspension into the concrete mixer.

The connection between the respective tanks and mixers can each be a flange connection with a closing device, e.g., a flat slide valve.

The first and each further crystallization tank has a stirring tool and may in particular have a drive for moving the stirring tool.

The first and each subsequent crystallization tank may have a side wall and a bottom surface, preferably a curved bottom surface. The side wall may extend parallel to the longitudinal axis of the crystallization tank. The agitator may have a rotatable agitator extension as the stirrer. Preferably, these formations may be spiral formations. The formations can be designed in such a way that they can be guided over at least 50% of the bottom surface with a distance of less than 10 cm, preferably less than 5 cm, in particular between 0.5-4 cm distance. This allows a large quantity of the cement suspension, including settled constituents, to be moved and preferably re-suspended.

The formations, in particular in the design as spiral formations, can have edge wipers in the direction of the base. While the formations can preferably be formed from metal, the edge wipers are preferably formed from a softer material than the formations. Preferably, the edge wipers can be in the form of rubber and/or PTFE lips.

Between the first crystallization tank and the concrete mixer, the device can have a second, third, fourth, fifth, and further crystallization tank, preferably with a separate agitator. In this way, an increase in the volume of storable cement suspension for crystallization can be achieved. A second tank is particularly advantageous when large volumes are required, since the second tank can be used for metering the activated (premixer) and upstream (crystallization tank 1) suspension into the concrete mixer. This ensures that no suspension leaves the crystallization tank without sufficient pre-storage time.

Further advantageously, the device can be designed as a pressureless-operated system. An open or pressureless-operated system means that the pressure conditions in each container, i.e., the mixer and/or the crystallization tank(s), are the same or that, if pressure differences occur in the transfer of the cement suspension, pressure compensation takes place through the open valves.

At least along the connection between the first and/or second crystallization tank and the concrete mixer, a regulating member is arranged for draining and/or partially draining the respective crystallization tank into the concrete mixer. This regulating member can preferably be designed as a valve, in particular as a pinch valve.

Analogously, corresponding regulating members, e.g., valves, in particular pinch valves, can also be arranged between the cement premixer and the first crystallization tank and/or between the crystallization tanks.

Furthermore, the device can also advantageously have an arrangement for detecting a measured variable for controlling emergency draining of the first and/or each further crystallization tank. Such an arrangement can be, for example, a sensor for torque detection of the rotatable agitator and/or—in the case of a rotating crystallization tank—a sensor for torque detection of the rotatable drum of the crystallization tank. This measurement indirectly allows a statement to be made about the state of hardening of the cement suspension.

Other measured variables such as viscosity, density, the associated change in the speed of sound of a reflected ultrasonic signal, and/or the temperature of the cement suspension can also be used to monitor emergency drainage.

The device can also have a feed device, in particular a metering device, for supplying a superplasticizer, in particular as a function of the detected measured variable. This allows the composition of the cement suspension to be readjusted when a setpoint value is exceeded.

The device, in particular at least one of the crystallization tanks, also have according to the invention a sensor for determining the temperature of the cement suspension. Ideally, the temperature should be between 25-45° C. Corresponding setpoint values for residence times of the cement suspension during automated draining and/or partial draining of the crystallization tank can be adjusted depending on the temperature determined.

Preferably, the first and/or second, or any further crystallization tank can be designed for a quantity of at least 2 cubic meters, preferably 0.5-4 cubic meters of a cement suspension. Such quantities are atypical for cement premixers, in particular ultrasonic cement premixers, since the ultrasonic input, in particular in the case of intensive ultrasound, cannot be sufficiently homogeneous over the volume of the mixer in the case of larger volumes.

The intensive ultrasonic treatment enables activation of the cement constituents. In contrast to ultrasonically initiated vibratory mixing by ultrasound, vibration or other methods, the ultrasonic treatment in the preferred variant of the present method has the following characteristic data, which individually or in combination with each other characterize the type of ultrasonic treatment in more detail:

In particular, the ultrasonic probe is designed as a sonotrode and preferably operates in the following range within the scope of the present method (values refer to T=25° C. and normal pressure):

Intensity of the ultrasound emitted by the ultrasonic probe: 25-250 W/cm$^2$

When ultrasound is introduced into a medium, the particles and the medium are set in vibration. This vibration transfers kinetic energy of the ultrasonic wave. The intensity (I) corresponds to the power, e.g., watts, that is transported per area. The unit is power per area (e.g. W/cm$^2$).

Amplitude of the ultrasound emitted by the ultrasonic probe: 15-500 μm, preferably 15-120 μm.

The amplitude (u) describes the deflection of the ultrasonic wave (e.g., in μm). At constant frequency, higher amplitudes lead to an increase in intensity. The greater the amplitude, the greater the pressure differences during high-pressure and low-pressure cycles.

Frequency of the ultrasound emitted by the ultrasonic probe: preferably 10-30 kHz.

The frequency (f) describes the rate of oscillation at the tip of the ultrasonic probe. Since the formation, growth and implosion of vapor bubbles is a time-dependent process, higher frequencies result in smaller cavitation bubbles.

Specific energy input (into the medium—water): preferably 25-250 Ws/ml

The aforementioned values can be determined electroacoustically in water using a hydrophone, for example.

For metering the cement into the premixer, a diverter valve can be installed after the cement weigher so that the cement can be metered into the concrete mixer as well as into the premixer. However, a separate metering screw can also be guided to the premixer.

It has proven to be favorable in terms of energy and/or technology if only part of the cement required for the production of the concrete is mixed and pre-crystallized as a cement suspension, while another part is mixed directly in the concrete mixer, e.g., together with the aggregates. This is of particular advantage in the context of the method according to the invention in contrast to the prior art.

To achieve the improved early strength, it is not necessary to pretreat the entire quantity of cement, which makes additional water available for the premixing process (the w/c ratio of the suspension can be selected higher), saves energy and advantageously reduces the dimensioning of the required machines.

Further according to the invention is a method for producing a concrete, with a device according to the invention, wherein the method comprises the following steps:

i) Preparing a cement suspension in a cement premixer
ii) Stirring the cement suspension in a crystallization tank for a predetermined residence time; and
iii) Transferring the cement suspension to a concrete mixer after the predetermined residence time.

An essential measure for the development of the early strength is the residence time. This corresponds to the residence or crystallization time of the premixed suspension in the crystallization tank.

The residence time depends on the concrete production process (mixing time, concrete volume per hour, concrete composition) and the desired strength increase.

A crystallization tank (or storage/dwell/reservoir tank) is a container in which the suspension is stored for a predefined period of time (0.5-6 hours) under continuous stirring/circulation. After the residence time, the suspension is dosed into the concrete mixer.

The residence or dwell time corresponds to the time that the activated suspension remains in the crystallization tank under continuous stirring or circulation.

Advantageously, the first crystallization tank has an outlet that opens into an inlet of the concrete mixer or into a second (or third, fourth, ...) crystallization tank. The device further comprises a regulating member arranged in the outlet of the first crystallization tank and/or in the inlet of the concrete mixer. The device can also have a first evaluation and/or control unit, which is equipped to operate the regulating member for partial or complete draining of the first crystallization tank after a residence time of the cement suspension in the first crystallization tank of 0.5-6 hours.

Further advantageously, the cement premixer may comprise a treatment vessel having a treatment chamber, wherein the at least one ultrasonic probe, at least partially, extends into the treatment chamber, and wherein the ultrasonic probe emits ultrasound, wherein the emitted ultrasound or the ultrasonic signal, e.g., by the evaluation and/or control unit, is adjusted such that it has an intensity of 25-250 W/cm$^2$ and an amplitude of 15-500 μm.

In addition, during the production of the concrete, a first partial quantity of cement can be added to the cement premixer and a second partial quantity of cement can be added to the concrete mixer, which is particularly advantageous in terms of energy.

The proportion of cement pretreated in this way is preferably between 5-95%, particularly preferably between 10-25% of the total cement content.

The control or setting of the setpoint value for the preferred residence time of the cement suspension within the crystallization tank can advantageously be carried out as a function of a predetermined time at a predetermined temperature. Since crystallization is temperature dependent, this control provides better control over the quality of the cement suspension.

For better and more comprehensive transport, the transfer of the cement suspension into the concrete mixer can be done in batches.

The stirring speed in the first and each further crystallization tank and/or inflow and/or outflow of cement suspension into the first or each further crystallization tank can be controlled by a sensor and/or sensor arrangement. For this purpose, one or more temperature sensors, ultrasonic sensors for determining the ultrasonic transit time and/or sensors for torque detection can preferably be used to monitor the quality of the cement suspension and, in particular, its strength.

By means of temperature regulation, the temperature of the cement suspension in the first or any further crystallization tank can be adjusted to a temperature between 10-45° C. The adjustability to below 20° C., especially 10-20° C., allows better storage.

The crystallization time or residence time, as well as the time of emergency draining, can be set depending on the temperature and/or the above-mentioned measured variable.

The cement suspension can preferably be added to the concrete mixer only after a residence time of between 1-8 hours. The transfer of cement suspension into the concrete mixer is carried out according to a predetermined protocol.

The water/cement (w/c) ratio of the cement suspension can advantageously be between 0.5-2. The residence time is selected depending on the reaction rate of the cement. The indicated times are optimal for the above-mentioned specification of the residence time.

The pre-storage time of the cement suspension before transfer to the concrete mixer can advantageously be between 1-8 hours.

Particularly preferably, the aforementioned w/c ratio but also the resting phase can be combined with the aforementioned ultrasonic treatment of the cement suspension.

The proportion of ultrasonically pretreated cement in the concrete can advantageously be between 5-95 wt. %, ideally 10-25 wt. %.

The stirring speed in the first and/or second crystallization tank and/or inflow and/or outflow of cement suspension into the first and/or second crystallization tank can be controlled by a sensor and/or sensor arrangement. For this purpose, one or more temperature sensors, ultrasonic sensors for determining the ultrasonic transit time, and/or sensors for torque detection can preferably be used to monitor the quality of the cement suspension and, in particular, its strength.

Another advantage within the scope of the present method is the provision of an intelligent control method and/or a control device for maintaining a defined suspension quality. A series of sensors in the tank permanently analyzes the properties of the suspension (especially temperature, viscosity, density, electrical conductivity, ultrasonic transit time), evaluates them and initiates measures based on the sensor measurement data, such as adding new suspension and draining old suspension.

The temperature in the tank is a particularly important factor influencing the quality of the suspension (=reactivity). This can advantageously be kept permanently in the desired range by means of a cooling and heating device, for example by forming a double-walled tank wall as part of the first and/or second crystallization tank or by means of heat exchangers on or in the crystallization tank.

In particular, a sensory detection of a substance-dependent physical measured variable of the cement suspension located in the first and/or second crystallization tank can be carried out.

Preferably, the inflow and/or outflow quantity, the stirring speed and/or the temperature can then be controlled on the basis of the measured values determined by the sensory detection.

BRIEF DESCRIPTION OF THE DRAWING FIGURES

In the following, a device for the production of concrete according to the invention is explained in more detail on the basis of an exemplary embodiment with the aid of the enclosed drawings. The drawings also contain several features which, taken separately, can be combined in an obvious manner with other exemplary embodiments not shown. The exemplary embodiments in their entirety are in no way to be understood as limiting the scope of protection of the present invention, wherein.

DETAILED DESCRIPTION

Figure 1:
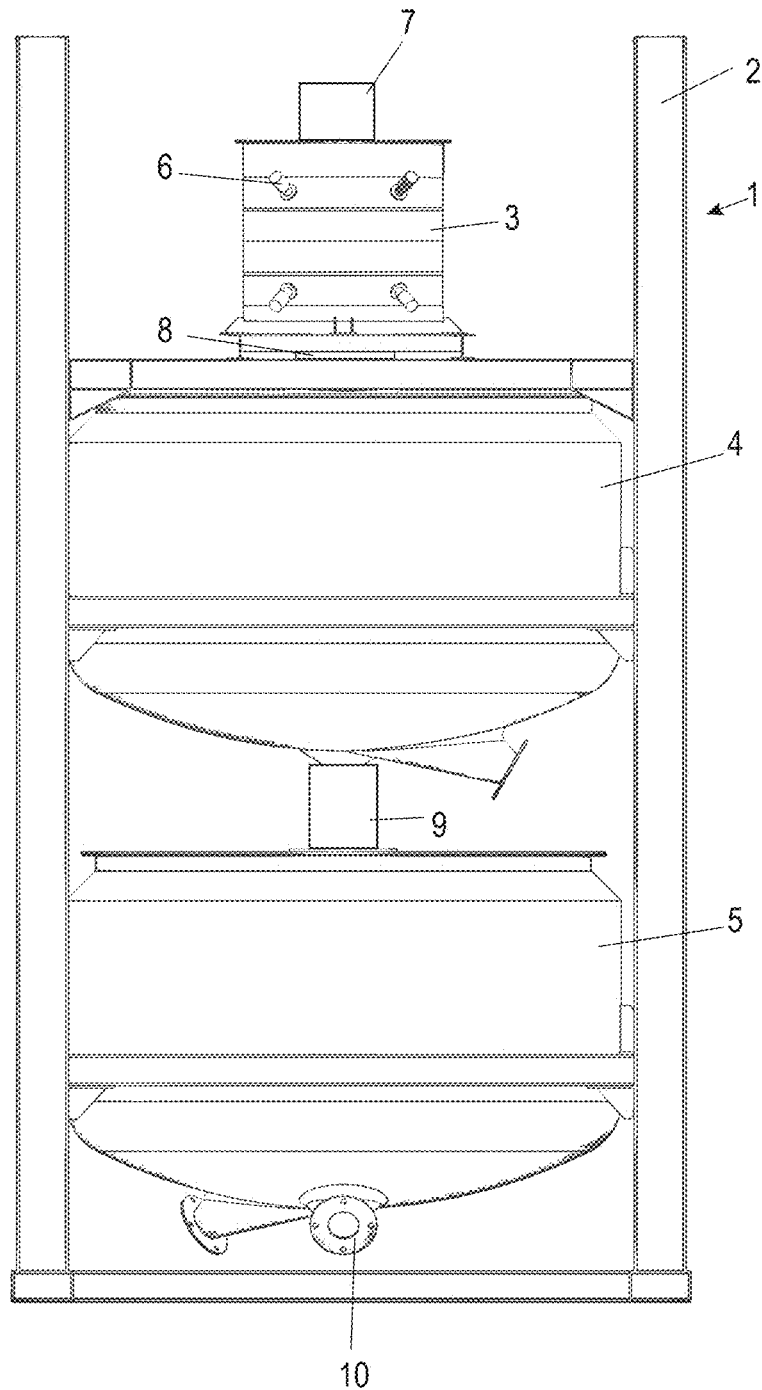
FIG. 1 shows a side view of an exemplary embodiment comprising a cement premixer and a first and a second crystallization tank of a device according to the invention.

FIG. 1 shows a device 1 according to the invention, comprising a cement premixer 3 and two crystallization tanks 4 and 5.

An inlet opening 7 is provided above the cement premixer 3.

The cement premixer 3 and the two crystallization tanks 4 and 5 are connected to each other by a machine frame 2.

The cement premixer 3 has ultrasonic probes 6 extending through the wall of the cement premixer into the interior.

Transfer lines are provided between the cement premixer 3 and the two tanks 4 and 5. The transfer lines can have regulating members, e.g., valve devices. Tank 5 has an outlet 10.

Each of the crystallization tanks 4 and 5 and the cement premixer 3 has agitators 7-9.

Figure 2:
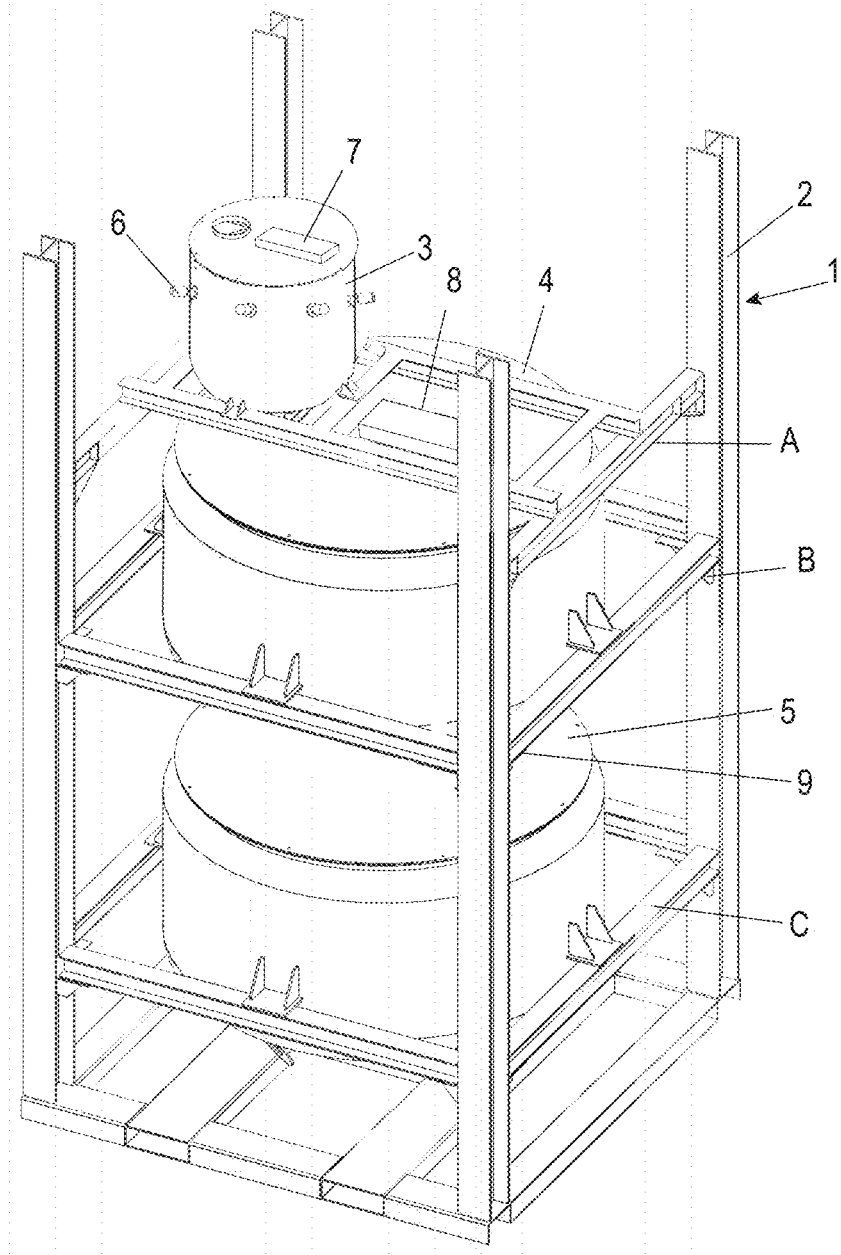
FIG. 2 shows a perspective view of the exemplary embodiment of FIG. 1.

FIG. 2 shows a perspective view of the device of FIG. 1. The storage levels A, B and C along which the aforementioned containers are stored can be seen.

Figure 3:
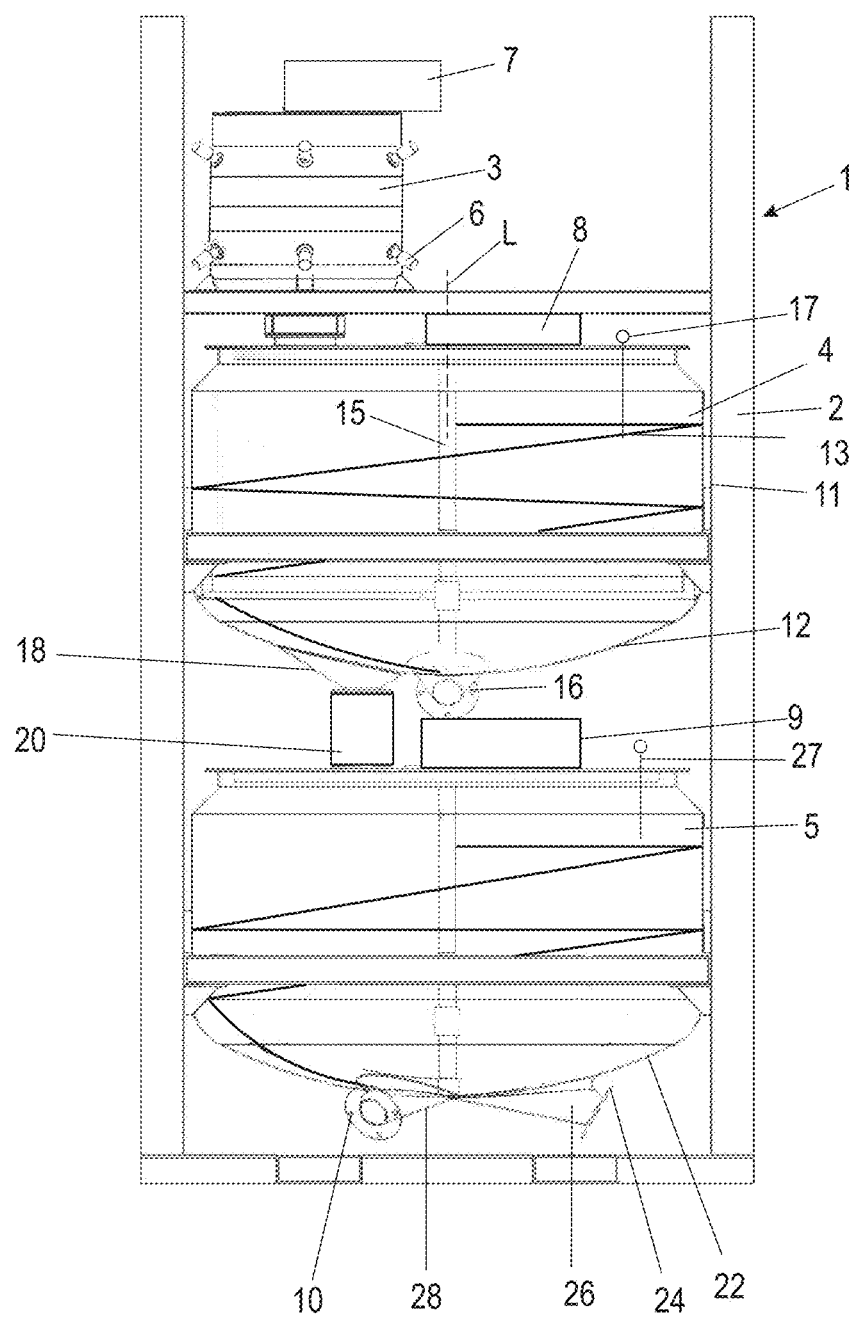
FIG. 3 shows a sectional view along the longitudinal axis of the crystallization tanks.

FIG. 3 discloses further details. For example, the crystallization tank 4 has an agitator 8 with a rod 15 and spirally wound stirring blades 13. The crystallization tank has a cylindrical jacket section 11 and a curved bottom section 12.

A sensor element 17 is arranged in the upper area of the crystallization tank 4. This can be a temperature sensor, for example. The crystallization tank 4 has an outlet 18 that merges into a transfer line 20. Furthermore, the crystallization tank 4 has an emergency drain 16, via which the tank 4k can be drained in an emergency, e.g., in the case of an overlaying cement suspension.

The crystallization tank 5 has a similar design. Both the sensor element 27 and the agitator 9 can be seen. In the bottom section 22 there are two drain nozzles 26 and 28, each of which has flanged ends 24. One of the two drain nozzles again serves as an emergency drain, while the other enables transfer to the concrete mixer.

Figure 4:
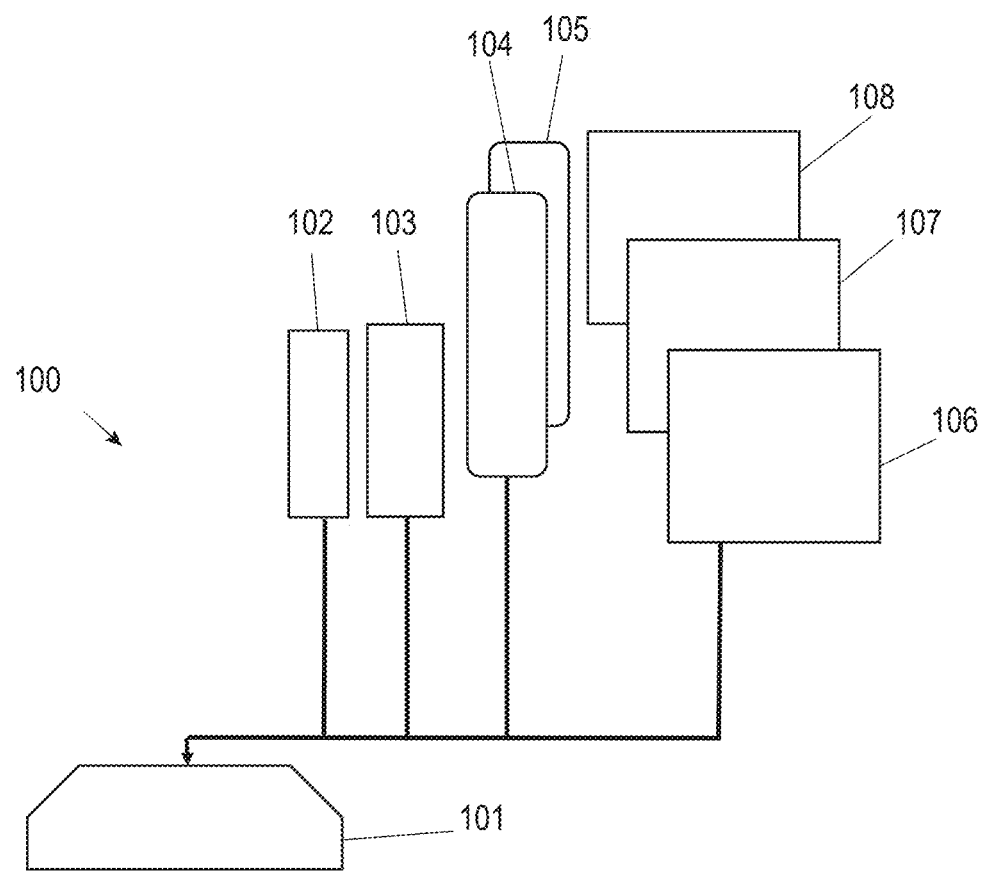
FIG. 4 shows a schematic representation of concrete production by conventional methods.
Figure 5:
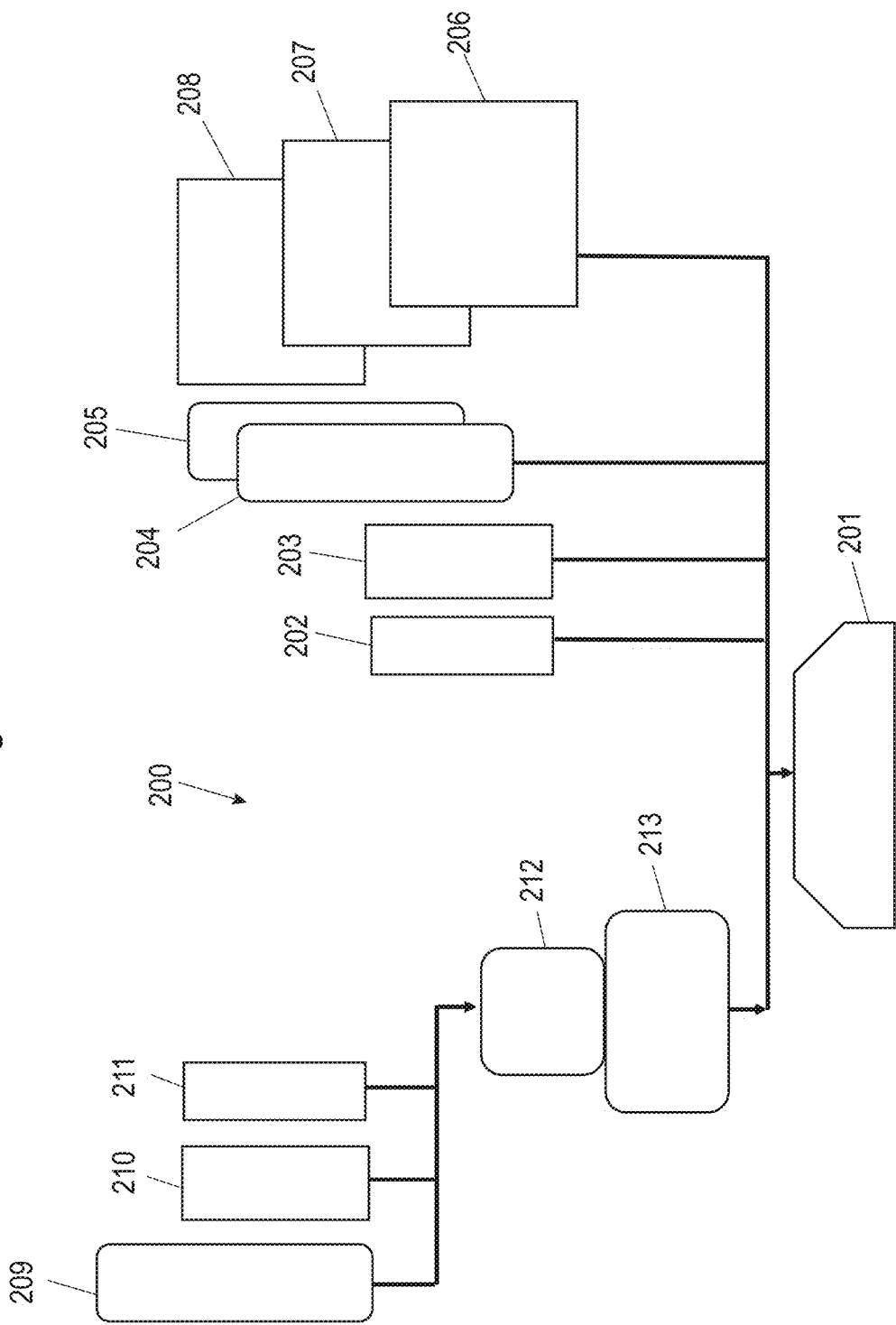
FIG. 5 shows a schematic representation of a concrete production according to an embodiment of the present invention.

FIG. 4 shows a conventional method 100 for producing concrete. In this process, water 103, cement 104 and 105, additives 102, and, optionally, binders and admixtures are mixed with gravel 106, 107 or sand 108 in a concrete mixer 101.

Persons skilled in the art of concrete know binders as inorganic or organic substances which can be processed in a plastic state and which harden in the course of a certain time, firmly bonding other substances, e.g., aggregates, to each other. The binders used in the concrete industry are of mineral origin and, with some exceptions, are obtained from certain rocks by firing and ground to a fine powder. Mixed with water, the binder glue is formed first. Chemical reactions, and in some cases also physical surface forces, can cause the binder paste to solidify into a stone-like state, wherein any fillers can be cemented together.

Persons skilled in the art are also familiar with the term "admixtures" or "concrete admixtures" for concrete. These are substances which are added to the concrete in finely divided form, e.g., in liquid, powder form or as granules or paste, in small quantities in order to influence certain properties of the fresh or hardened concrete by chemical or physical action. Typical admixtures are concrete plasticizers, superplasticizers, air entraining agents, sealants, retarders, accelerators, grouting aids and/or stabilizers.

In addition, persons skilled in the art of concrete are familiar with the term additives or concrete additives. These are finely dispersed substances used in concrete to improve or achieve certain properties. Such substances are present as volume constituents in a concrete composition in significantly larger quantities than the admixtures. They are therefore also called fillers. According to DIN EN 206-1 and DIN 1045-2, a distinction is made between two types of inorganic additives. Type I additives are almost inactive additives such as stone dust or pigments. Type II additives are pozzolanic or latent hydraulic additives such as trass, fly ash or silicate dust.

Finally, a concrete mix contains a significant proportion of aggregates such as gravels and sands, the grain size and proportion of which may vary depending on the type of concrete. These aggregates are also occasionally grouped together with other materials under the generic term of aggregates.

The core of the present invention is now to provide a method solving these technological obstacles and still ensures the high early strengths of a concrete with e.g., ultrasonic premixing stage.

In this process, cement 209, water 210 and additives 211 are mixed in a cement premixer 212 and ultrasonically activated. The cement suspension is then transferred to a crystallization tank 213 and from there to a concrete mixer 201. Admixtures 202, water 203, cement 204 and 205 as well as gravel 206, 207 and sand 208 can also be fed into the concrete mixer 201 as part of the method 200 according to the invention.

The invention is based on the fact that there is an advantageous w/c ratio or w/c range for the production of a cement suspension in which the suspension can be well homogenized and activated (e.g., by ultrasound). This advantageous w/c ratio depends on the type of cement and the admixtures used and lies between 0.5 and 2. Furthermore, the invention is based on the fact that not the entire proportion of cement and water has to be premixed and activated in order to bring about a significant increase in early strengths.

In a preferred variant of the present invention, the cement suspension provided in the cement premixer is prepared from cement, water and, optionally, admixtures as optional components. Additives, on the other hand, are not provided in the cement suspension.

This means that part of the cement is dosed into the premixer for activation and part of the cement is dosed into the concrete mixer. This can be carried out either by a separate metering device (silo+screw conveyor) at the premixer or at the existing concrete mixing plant by a distributor at the cement weigher and a screw conveyor from the cement weigher to the premixer.

Furthermore, part of the method according to the invention is not to dose the premixed and activated cement suspension into the concrete mixer immediately after mixing, but to convey it into a rest or crystallization tank stored downstream of the suspension mixer. The crystallization tank has a volume of approximately the amount of suspension required for one hour of concrete production.

This has the advantage that the necessary volume of the premixer is reduced compared to the variant that uses the entire amount of cement and water (and optionally sand) for pretreatment. The production and activation of the suspension with subsequent storage in the crystallization tank has the further advantage that the suspension can be removed or dosed as quickly as desired after a sufficient crystallization time, and thus the mixing times can still be selected to be short. The rest or crystallization time results in a significant increase in early strengths, even compared to the variant in which the entire calculated available quantity of cement and water is premixed and activated. Without a resting phase, this potential is not achieved. If ultrasound is used for activation in the premixing stage, the early strengths are again significantly increased. Ideally, this resting phase lasts between 1-8 hours, depending on the cement type and composition of the suspension.

The mixing time of the suspension mixing process in the production process should be very short to enable short overall mixing times. This is not always guaranteed, especially when the cement suspension is activated, e.g., by ultrasound. In the production of large concrete elements (e.g., bridge girders), larger quantities of concrete have to be produced in a short time in order to complete the concrete element quickly. This also poses a particular challenge for the premixing of a cement suspension in an ultrasonic premixer, since the mixing chamber is limited to a certain size for effective ultrasonic application. By producing the suspension "in stock", these components can also be manufactured without a relevant increase in concrete mixing times.

Compared to the prior art, the method presented here is characterized by the following novel approaches:
- Only the proportion of cement suspension necessary for optimum strength development is premixed and activated, ideally between 10-25% of the cement proportion.
- The premixed and activated cement suspension is conveyed in stock to a rest or crystallization tank and remains there for a certain time, ideally between 1-8 hours, and is continuously mixed at low shear rates or circulated by a pump.
- Removal from the crystallization tank takes place successively after the pre-storage period, wherein the concrete mixing times are not extended.
- The problem of high moisture content of the aggregates can thus be effectively countered.
- The mixing times of the concrete mixing process are not extended.

The early strengths are significantly increased with the same concrete composition.

If the crystallization tank is supplemented by further tanks of the same size, even very large volumes of concrete can be produced accurately with activated cement suspension (e.g., ready-mix concrete production)

Figure 6:
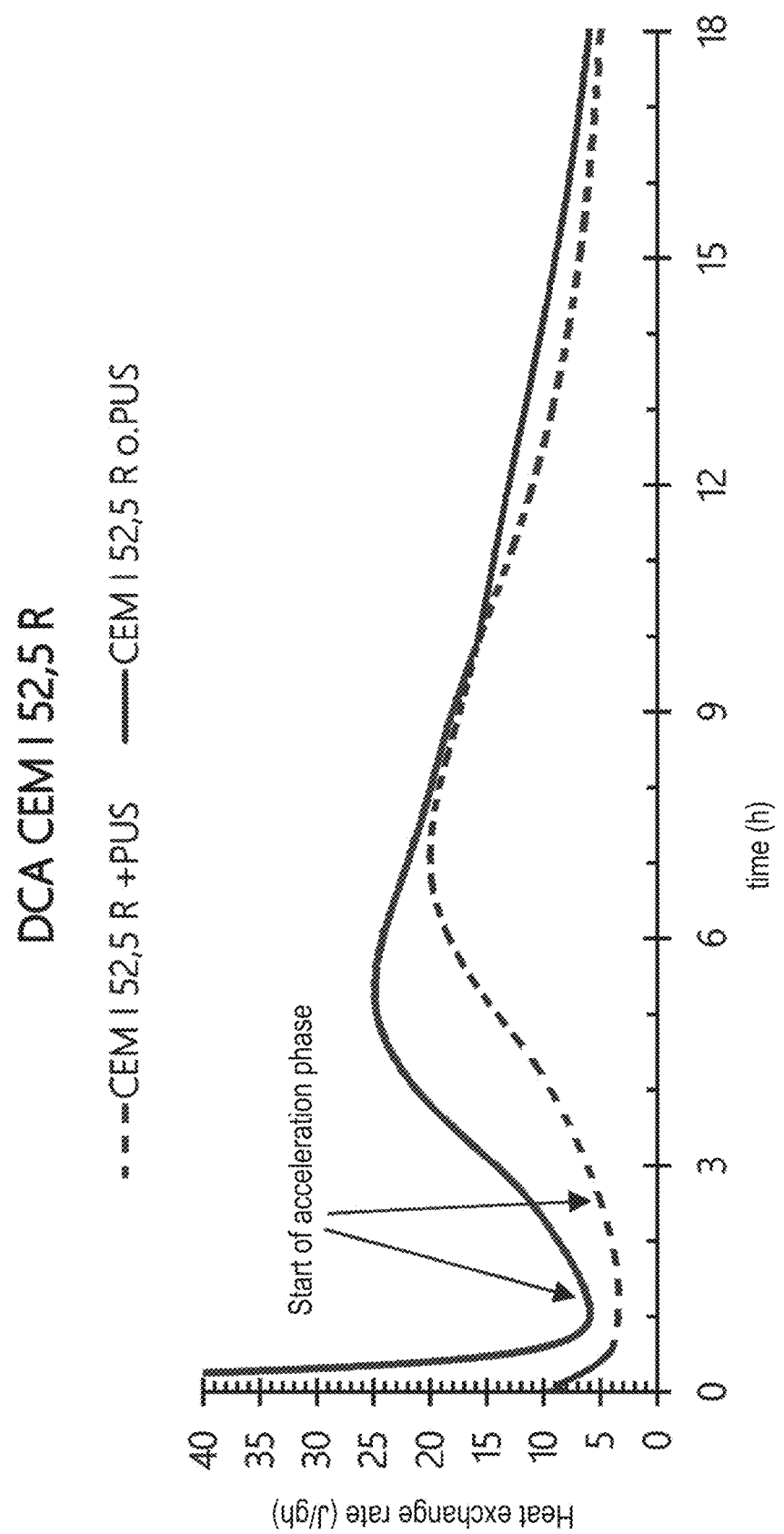
FIG. 6 shows a diagram of heat release rate.

An optimized pre-storage time in the crystallization tank is described below:

FIG. 6 shows the time-depended heat release rate in J/gh. This is a calorimetric measurement of Portland cement, which is designated as CEM I 52,5 R in the diagram, with and without ultrasonic treatment, designated as PUS in the diagram.

One can see a clearly the onset of the acceleration phase and a maximum of the heat development after about 4-5 h.

The reaction of cement with water follows a specific kinetic path. At a typical water-to-cement ratio of 0.5, the heat release rate curve looks like FIG. 6.

In patent application DE 10 2020 132 015.9, the use of a pre-storage of activated cement suspension is proposed, which does not disturb the concrete production process and yet increases early compressive strengths.

Further investigations have now shown that it offers process engineering advantages to increase the water content of the suspension and/or the pre-storage time, in some cases significantly.

In concrete terms, this means that the time of addition of the suspension is coupled to the heat release rate and the suspension is only dosed when the curve has overcome the rest phase between 1-3 hours and records a renewed increase in the heat release (=chemical reaction).

This time varies greatly with the materials used (cement and superplasticizer type as well as water content) and should be determined in advance.

The preferred parameters for the cement suspension are now:

Water/cement $(w/c)$ ratio = 0.5-2

Pre-storage time = 1-8 hours

Proportion of pretreated cement 5-95%, ideally 10-25%.

The w/c ratio must be selected in such a way that the rise of the curve (so-called "acceleration phase") does not take too long (w/c ratio lower) but also in such a way that there is no solidification of the material during pre-storage (w/c ratio higher). A w/c ratio well suited for this is around 1.0±0.25, depending on the cement type and superplasticizer type and quantity.

The pre-storage time then depends on the selected w/c ratio and the reactivity of the cement. In order to keep the process engineering effort associated with pre-storage low, a maximum pre-storage time of 4 hours is aimed for.

With this method, the early strength can again be significantly increased and the proportion of cement that has to be premixed and activated can be reduced.

In an exemplary method sequence, part of the cement is premixed with water, sonicated, and then stored for a longer period. After storage, the cement suspension is metered into the concrete mixer. As described previously, ultrasonic activation takes place as a result of sonication. It takes place at an intensity of 25-250 W/cm$^2$ and an amplitude of the ultrasound of 15-500 μm.

Hydrate nuclei are formed in the suspension, which significantly influence the early strength of concrete. This can be proven by microscopic images, among other things.

Since the calculated water available for a premixing process is often insufficient, the proportion of cement to be premixed is reduced.

Figure 7:
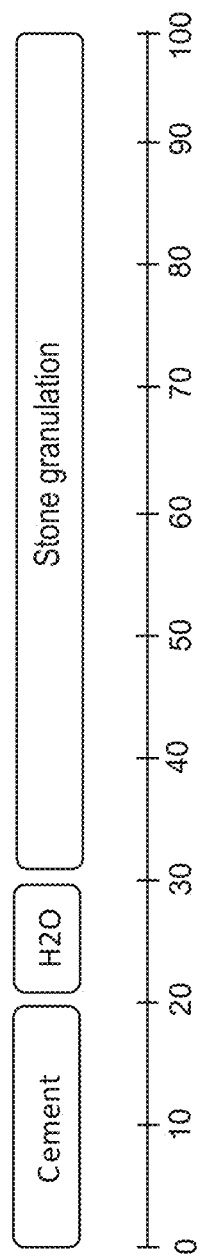
FIG. 7 shows a representation of a composition of a first concrete mix.

In concrete with dry aggregates, the 3 main components are distributed—as shown in FIG. 7.

In this case, the water content is low but sufficient for a premixing process, since a flowable suspension can still be prepared and metered using superplasticizer.

Figure 8:
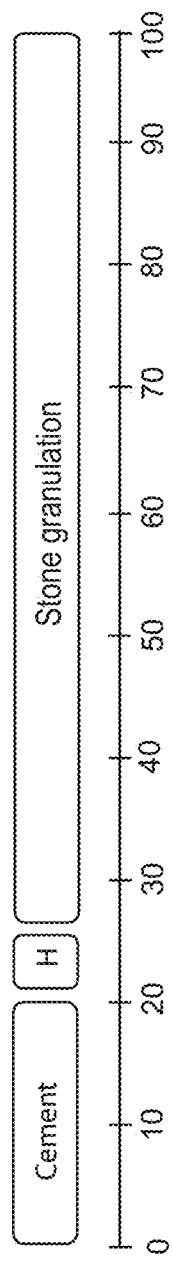
FIG. 8 shows a representation of a composition of a second concrete mix.

If the aggregates are moist, the proportion of the aggregates in the volumetric calculation increases and that of the water is reduced by the proportion of moisture bound to the aggregates (see FIG. 8). FIGS. 7 and 8 each show the metering quantities of the respective components. The aggregates in the case of FIG. 8 are wetter than FIG. 7 and therefore contain more water. The figures show with the bar "H2O" only the amount of added water in addition to the aggregates. "H" and "H2O" are to be understood synonymously in the figures.

Only a much too small amount of water is now available for the mixing process, and the premixing process is very difficult to apply (if at all). In the case of ultrasonic treatment, the high solids concentration often leads to undesirable side effects such as negative superplasticizer-cement interactions, strong heating, and problems with dosing/draining the premixing tank.

Figure 9:
FIG. 9 shows a representation of a mixing ratio of cement suspension and water.

In order to nevertheless guarantee the advantages of a premixing process with ultrasound, the premixing and storage concept was developed. The core here is the use of only a partial quantity of the available cement—see FIG. 9.

Due to the significantly lower solids content of the suspension produced in this way, the production process is simplified compared to the variant in which the entire cement is premixed.

However, the number of hydrate nuclei that can be formed is limited to the amount of cement. This led to the concept of storing or crystallizing the suspension until a sufficient amount of hydrate nuclei has formed to accelerate hydration. The number of hydrate phases increases with the pre-storage time. For this purpose, a measurement of the start of solidification, i.e., the point in time at which the hardening process has progressed so far that the concrete cannot be further processed, is shown below.

Figure 10:
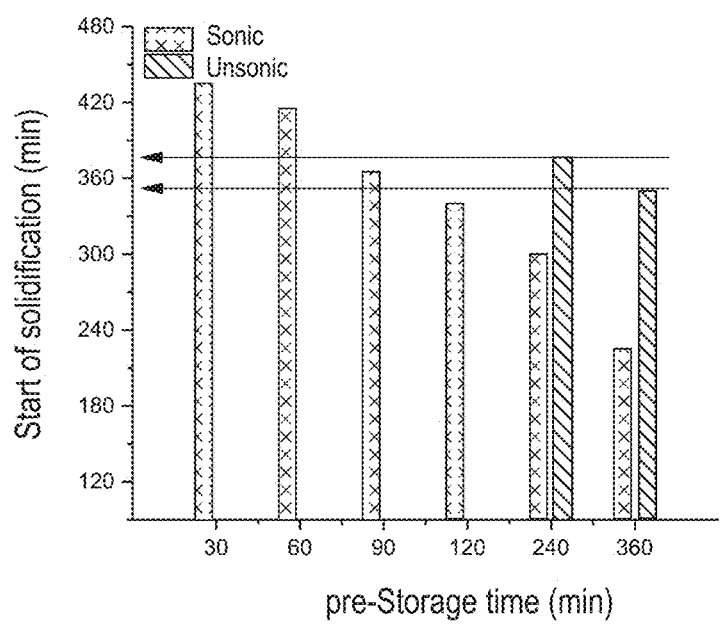
FIG. 10 shows a diagram showing the correlation between solidification onset and pre-storage time.

FIG. 10 shows the onset of solidification of a cement mortar with the following parameters:

w/c ratio of the mortar = 0.50 w/c ratio of the upstream suspension = 1.0

Proportion of pretreated cement = 25%.

Sonication of the suspension with 20 kHz and 60 seconds/liter

FIG. 10 shows that the onset of solidification (Y axis) decreases with increasing pre-storage time (X axis). This behavior is particularly pronounced for suspensions that have been sonicated (cross-hatched). Without sonication, the reduction of the solidification time is not so pronounced (dash-hatched).

Figure 11:
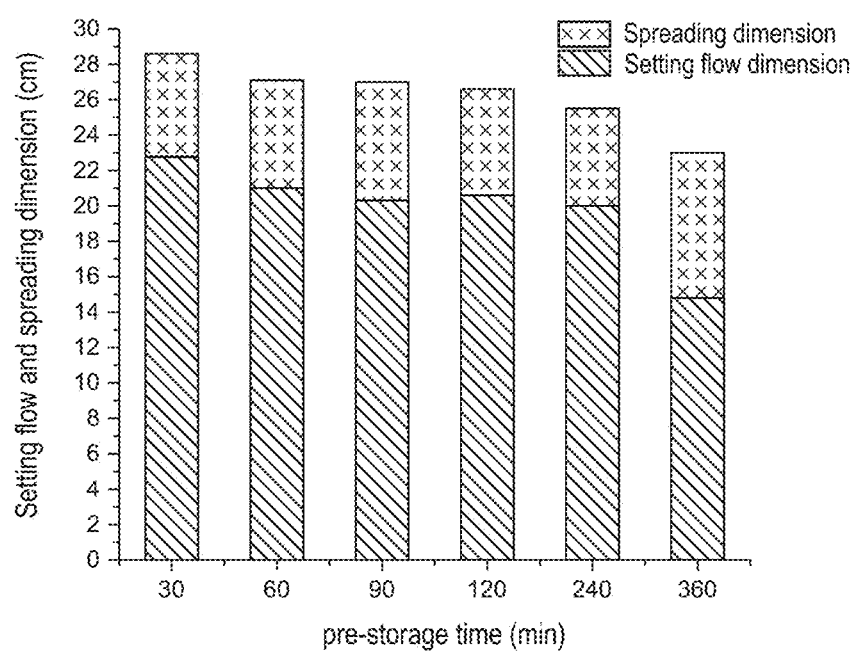
FIG. 11 shows a diagram showing the pre-storage time of an ultrasonically treated cement mortar in relation to the slump flow and slump spread.

As a rule, the workability is also influenced by the pre-storage. This is determined for cements by means of slump flow and slump spread. FIG. 11 shows the slump flow and slump spread of the cement mortar already described in FIG. 10 with a cement suspension of different length. Here, it is measured how far a mortar flows on a table without vibration (slump flow) and with 15 impacts (slump spread).

Here it can be seen that both the slump flow and the spreading dimension decrease with increasing pre-storage time. This means that the workability of the mortar is reduced. In the first 240 minutes, however, the reduction is only slight, which means no significant changes for the concrete. After 240 minutes, a more pronounced decrease occurs.

From these results it can be concluded that the ideal pre-storage time for the mortar under consideration is about 240 minutes. In this case, the changes in workability are small with a simultaneous significant increase in early strength.

For the concrete scale, the effect can be illustrated with the following data:

A concrete with Portland cement (CEM I 52,5 R) and a w/c ratio of 0.47 was produced. The concrete was mixed with a superplasticizer (type: polycarboxylate ether) with 240 minutes of pre-suspension and sonication (w/c=1.0) and a volume of 0.3 m$^3$.

Figure 12:
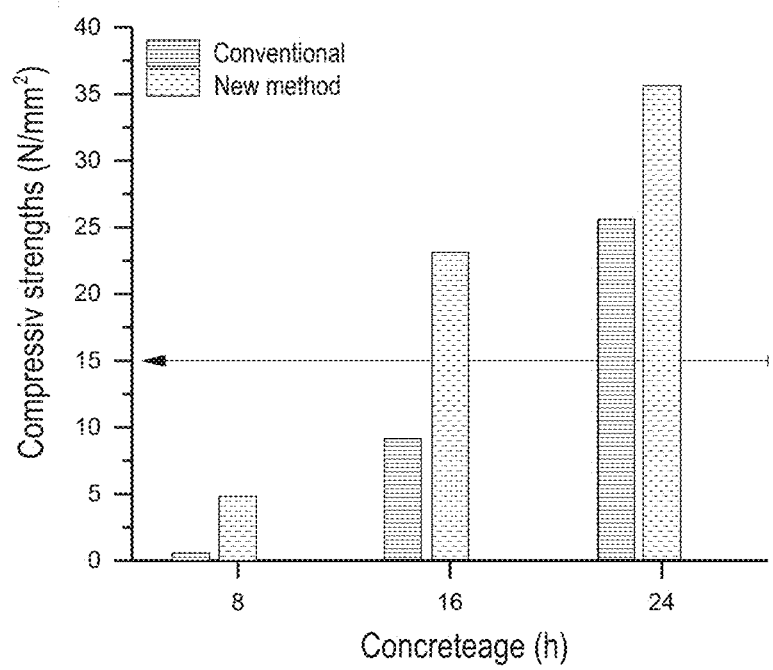
FIG. 12 shows a diagram of compressive strength related to concrete age.

FIG. 12 shows the compressive strength development over the first 24 hours of a concrete produced by the method according to the invention in comparison with a conventionally produced concrete. It can be clearly seen that the concrete sample with pre-treated suspension produced by the method according to the invention exhibits significantly higher compressive strengths at all times measured.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Device
2 Machine frame
3 Cement premixer
4 Crystallization tank
5 Crystallization tank
6 Ultrasonic probe
7 Agitator
8 Agitator
9 Agitator
10 Outlet
11 Jacket section
12 Bottom section
13 Stirring blade
14 -
15 Rod
16 Emergency drain
17 Sensor element
18 Outlet
19 -

20 Transfer line
21 -
22 Bottom section
23 -
24 Flange end
25 -
26 Drain nozzle
27 Sensor element
28 Drain nozzle
100 Method
101 Concrete mixer
102 Additives
103 Water
104 Cement
105 Cement
106 Gravel
107 Gravel
108 Sand
201 Concrete mixer
202 Admixtures
203 Water
204 Cement
205 Cement
206 Gravel
207 Gravel
208 Sand
209 Cement
210 Water
211 Additives
212 Cement premixer
213 Crystallization tank

What is claimed is:

1. A device for producing a concrete, the device comprising
    i a cement premixer configured to mix a cement suspension, wherein the cement premixer has at least one ultrasonic generator, which is at least one ultrasonic probe, to provide a cement suspension;
    ii at least one first crystallization tank, which is a crystallization tank arrangement having the at least one first crystallization tank, configured to increase the early strengths of the concrete;
    iii a concrete mixer configured to produce a concrete mixture from the premixed cement suspension, with the addition of aggregates,
    wherein the device further comprises a cement weigher for the dosage of cement in the premixer.

2. The device of claim 1, wherein the cement premixer, the at least one first crystallization tank, and the concrete mixer are arranged with respect to an earth gravity field in such a way that the cement suspension is flowable by gravity from the cement premixer into the at least one first crystallization tank and from the at least one first crystallization tank into the concrete mixer.

3. The device of claim 1, further comprising a first crystallization tank having an agitator.

4. The device of claim 1, further comprising:
    a second crystallization tank arranged between the at least one first crystallization tank and the concrete mixer, the second crystallization tank having a separate agitator.

5. The device of claim 4, wherein at least along the connection between the first and/or the second crystallization tank and the concrete mixer, a regulating member is arranged for draining and/or partially draining the respective crystallization tank into the concrete mixer.

6. The device of claim 5, wherein the regulating member is a valve.

7. The device of claim 6, wherein the valve is a pinch valve.

8. The device of claim 4, wherein the device has an arrangement configured to detect a measured variable and to control an emergency draining of the at least one first crystallization tank or the second crystallization tank.

9. The device of claim 1, further comprising by a distributor for the feed of concrete from the weigher either to the concrete mixer or to premixer.

10. The device of claim 8, further comprising:
    a feed device, which is a metering device, configured to supply a flow medium as a function of the detected measured variable.

11. The device of claim 4, wherein the at least one first crystallization tank or the second crystallization tank is configured for a quantity of between 1.5-4 cubic meters of a cement suspension.

12. The device of claim 4, wherein the at least one first crystallization tank or the second crystallization tank comprises a heat exchanger arrangement, which is a double-wall segment, configured to control the temperature of the cement suspension along a wall of the crystallization tank.

13. The device of claim 4, wherein the at least one first crystallization tank or the second crystallization tank includes a sensor element configured to determine a quality of the cement suspension located in the crystallization tank, wherein the sensor element is a temperature sensor, a torque sensor, a conductivity sensor configured to determine thermal or electrical conductivity, a sensor configured to determine ultrasonic transit time or the ultrasonic velocity, or a density sensor.

14. The device of claim 4, wherein the device is provided with means of a cooling and heating device so that the temperature in the first or the second crystallization tank is kept permanently in a desired range.

15. The device of claim 1, wherein the device is a pressureless-operated system.

16. The device of claim 1, further comprising:
    a cement storage silo having a first partial supply line of cement to the cement premixer and a second partial supply line of cement to the concrete mixer; and a cement weigher configured to meter a first partial amount of cement to the cement premixer and to meter a second partial amount of cement to the concrete mixer.

17. The device of claim 8, further comprising:
    a control unit, an evaluation unit, or a control and evaluation unit configured to control an actuator based on the measured values determined by the sensor element, wherein the actuator is a temperature control device, an inlet valve, or an outlet valve.

18. The device of claim 1 wherein, the ultrasonic probe is designed as a sonotrode which operates in either one or more of the following ranges: an intensity of the ultrasound emitted by the ultrasonic probe between 25-250 W/cm2,
    an amplitude of the ultrasound emitted by the ultrasonic probe: between 15-500 μm,
    a frequency of the ultrasound emitted by the ultrasonic probe between 10-30 kHz,
    and a specific energy input between 25-250 Ws/ml.

19. A method for producing a concrete by using a device, the method comprising:
    mixing, by a cement premixer of the device, a cement suspension, wherein the cement premixer has at least one ultrasonic generator, which is at least one ultrasonic probe, to provide a cement suspension;

increasing, by at least one first crystallization tank of the device, which is a crystallization tank arrangement having the at least one first crystallization tank, the early strengths of the concrete;

producing, by a concrete mixer of the device, a concrete mixture from the premixed cement suspension, with the addition of aggregates.

* * * * *